US012789910B2

(12) United States Patent
Battista et al.

(10) Patent No.: US 12,789,910 B2
(45) Date of Patent: Nov. 10, 2026

(54) MOTOR-VEHICLE DASHBOARD, CENTRAL VENT UNIT, AND CORRESPONDING FASTENING SEAT

(71) Applicant: Stellantis Europe S.p.A., Turin (IT)

(72) Inventors: Francesco Battista, Turin (IT); Martino L'Altrella, Turin (IT); Marco Lucchesi, Turin (IT)

(73) Assignee: Stellantis Europe S.p.A., Turin (IT)

( * ) Notice: Subject to any disclaimer, the term of this patent is extended or adjusted under 35 U.S.C. 154(b) by 155 days.

(21) Appl. No.: 18/865,894

(22) PCT Filed: May 3, 2023

(86) PCT No.: PCT/IB2023/054600
§ 371 (c)(1),
(2) Date: Nov. 14, 2024

(87) PCT Pub. No.: WO2023/223133
PCT Pub. Date: Nov. 23, 2023

(65) Prior Publication Data

US 2025/0340246 A1 Nov. 6, 2025

(30) Foreign Application Priority Data

May 18, 2022 (IT) ........................ 102022000010313

(51) Int. Cl.
*B62D 25/14* (2006.01)
*B60H 1/00* (2006.01)
*B60H 1/24* (2006.01)
*B60K 37/20* (2024.01)

(52) U.S. Cl.
CPC ....... *B62D 25/142* (2013.01); *B60H 1/00507* (2013.01); *B60H 1/242* (2013.01); *B60K 37/20* (2024.01)

(58) Field of Classification Search
None
See application file for complete search history.

(56) References Cited

U.S. PATENT DOCUMENTS 5,311,960 A * 5/1994 Kukainis .............. B62D 25/142 296/70
6,854,783 B2 * 2/2005 Teranishi .............. B60K 35/50 296/70
2017/0043648 A1 2/2017 Hirota et al.

FOREIGN PATENT DOCUMENTS

DE 3806783 * 9/1989
JP H0825955 A 1/1996
JP 2001140820 A 5/2001
JP 2015058735 A 3/2015

OTHER PUBLICATIONS

International Search Report dated Sep. 25, 2023. 11 pages.

* cited by examiner

*Primary Examiner* — Joseph D. Pape
(74) *Attorney, Agent, or Firm* — RMCK Law Group PLC

(57) ABSTRACT

A dashboard assembly for a motor vehicle includes a shaped reinforcement body, which includes a fastening seat configured for receiving and fastening a central vent unit. The fastening seat includes two adjacent frames provided for selectively receiving supporting and flow-guide bodies of the vent unit. Each frame includes a bottom frame side defined by a thinned-out strip, provided on which are fastening portions mutually engaged with respective snap-action means of the vent unit.

10 Claims, 7 Drawing Sheets

MOTOR-VEHICLE DASHBOARD, CENTRAL VENT UNIT, AND CORRESPONDING FASTENING SEAT

CROSS-REFERENCE TO RELATED APPLICATION

This application is a 371 National Stage of International Application No. PCT/IB2023/054600, filed May 3, 2023, which claims priority to Italian Patent Application No. 102022000010313 filed May 18, 2022. The disclosure of each of the above applications is incorporated herein by reference in its entirety.

FIELD OF THE INVENTION

The present invention relates in general to the field of motor-vehicle interiors and more in particular regards a solution for installing a central vent unit of a motor-vehicle dashboard.

PRIOR ART

As is known, motor-vehicle interiors have a dashboard provided for arranging various components/instruments, such as finishing panels, pushbutton panels, regulating sliders, the instrument cluster, the radio/satellite-navigator system, etc. The dashboard is moreover provided with various air vents connected to a heating and air-conditioning system of the motor vehicle. The air vents comprise a channel for emission of a flow of air and means for controlling the direction of outflow.

Typically, the air vents are engaged to fastening inserts embedded within the structure of the dashboard, which comprises a supporting body generally made of plastic material, and possibly a coating layer. The document KR101735428 describes a solution for providing a central vent unit in a central portion of the dashboard.

The present invention stems from the desire to propose a motor-vehicle dashboard and a corresponding solution for installing a central vent unit, which will be particularly effective, exploiting the installation spaces present on the dashboard, in particular in the case of use of air vents of the same type and of the same dimensions on different motor-vehicle models that define different overall dimensions and spaces of installation.

OBJECT OF THE INVENTION

The object of the present invention is to provide, inside the passenger compartment of a motor vehicle, a dashboard that presents constructional features that will be particularly effective, enabling installation of vent units of the same type on dashboards with different overall dimensions and spaces of installation.

A further object of the invention is to obtain the above solution with means that are relatively simple to implement and involve low costs.

A further object of the invention is to obtain the above solution with means that will guarantee effective engagement of the central vent unit, guaranteeing its duration and reliability over time.

SUMMARY OF THE INVENTION

The above objects are achieved by a dashboard assembly for a motor vehicle, comprising:

a main dashboard body defining a passenger-side portion, a central portion, and a driver-side portion;

a shaped reinforcement body associated to said main dashboard body; and a central vent unit configured for directing a flow of air towards the inside of the motor vehicle, wherein said central vent unit comprises two air vents arranged side by side, as well as respective supporting and flow-guide bodies, wherein said shaped reinforcement body comprises a fastening seat obtained in said central portion and configured for receiving and fastening said central vent unit, wherein said fastening seat comprises two adjacent frames provided for selectively receiving said supporting and flow-guide bodies, and wherein each frame comprises a bottom frame side defined by a thinned-out strip, provided on which are fastening portions mutually engaged with respective snap-action means of the respective air vent, said bottom side having an elastic behaviour when the central vent unit is mounted within the fastening frame.

Further advantageous characteristics of the invention are defined in the dependent claims and in the ensuing description.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF A NUMBER OF EMBODIMENTS

In the ensuing description, various specific details are illustrated aimed at enabling an in-depth understanding of examples of one or more embodiments. The embodiments may be obtained without one or more of the specific details, or with other methods, components, materials, etc. In other cases, known structures, materials, or operations are not shown or described in detail so that various aspects of the embodiments will not be obscured. Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in various points in this description do not necessarily refer to one and the same embodiment. Moreover, particular conformations, structures, or characteristics may be combined in any adequate way in one or more embodiments and/or associated to the embodiments in a way different from what has been illustrated herein so that, for example, a characteristic exemplified herein in relation to one figure may be applied to one or more embodiments exemplified in a different figure.

The references used herein are provided only for convenience and hence do not limit the sphere of protection or the scope of the embodiments.

Designated as a whole by the reference 1 is a dashboard assembly of a motor-vehicle interior. The dashboard assembly 1 is mounted, in use, on a purposely provided supporting structure (not illustrated) carried by a portion of chassis of the motor vehicle (not illustrated). The dashboard assembly 1 extends throughout the width of the passenger compartment of the motor vehicle and is designed to perform various functions, amongst which to make available for use the instrument cluster, various pushbutton panels, regulating sliders, the radio/satellite-navigator system, etc.

Figure 1:
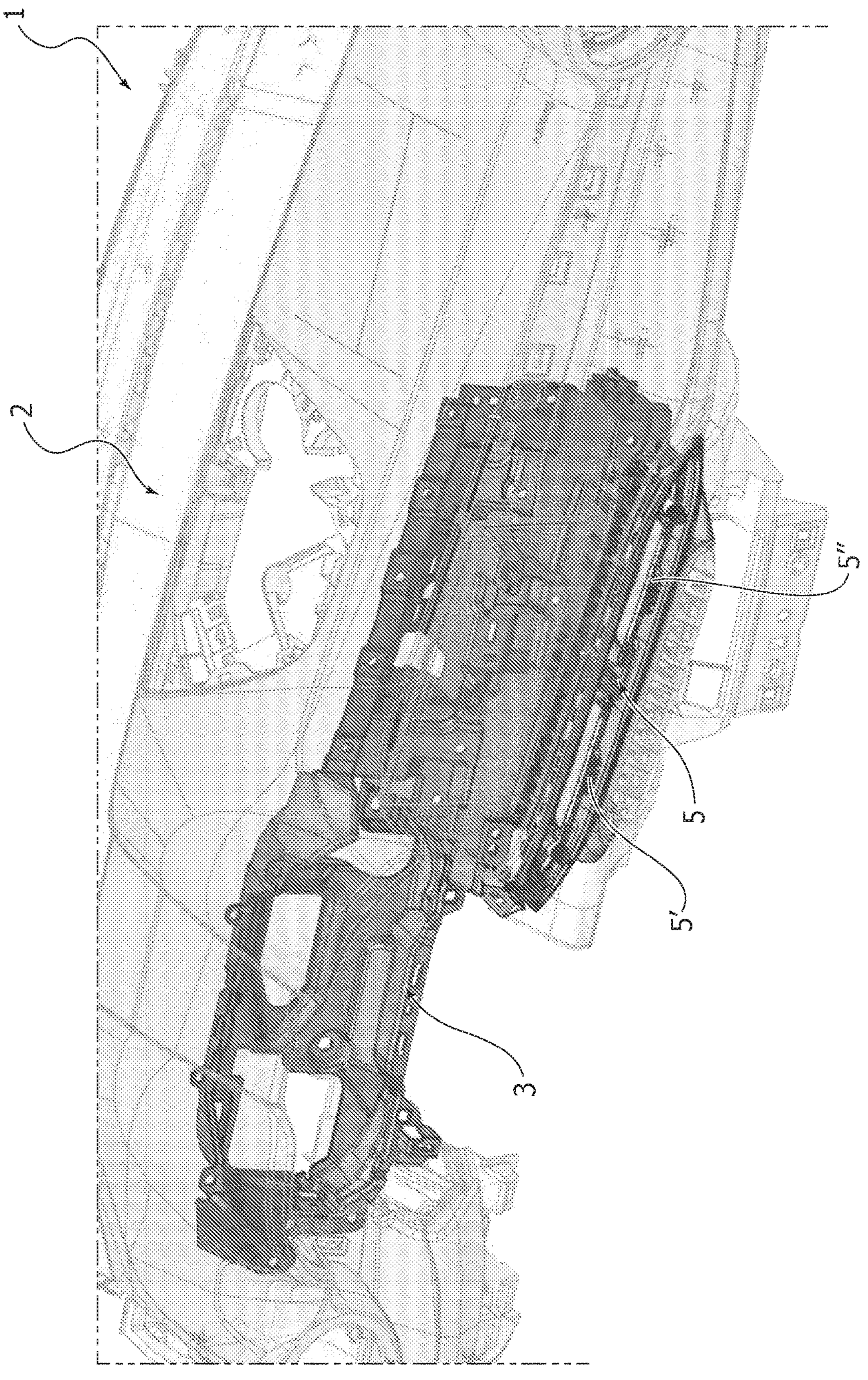
FIG. 1 is a perspective view of a motor-vehicle dashboard, including a central vent unit, according to a preferred embodiment.
Figure 2:
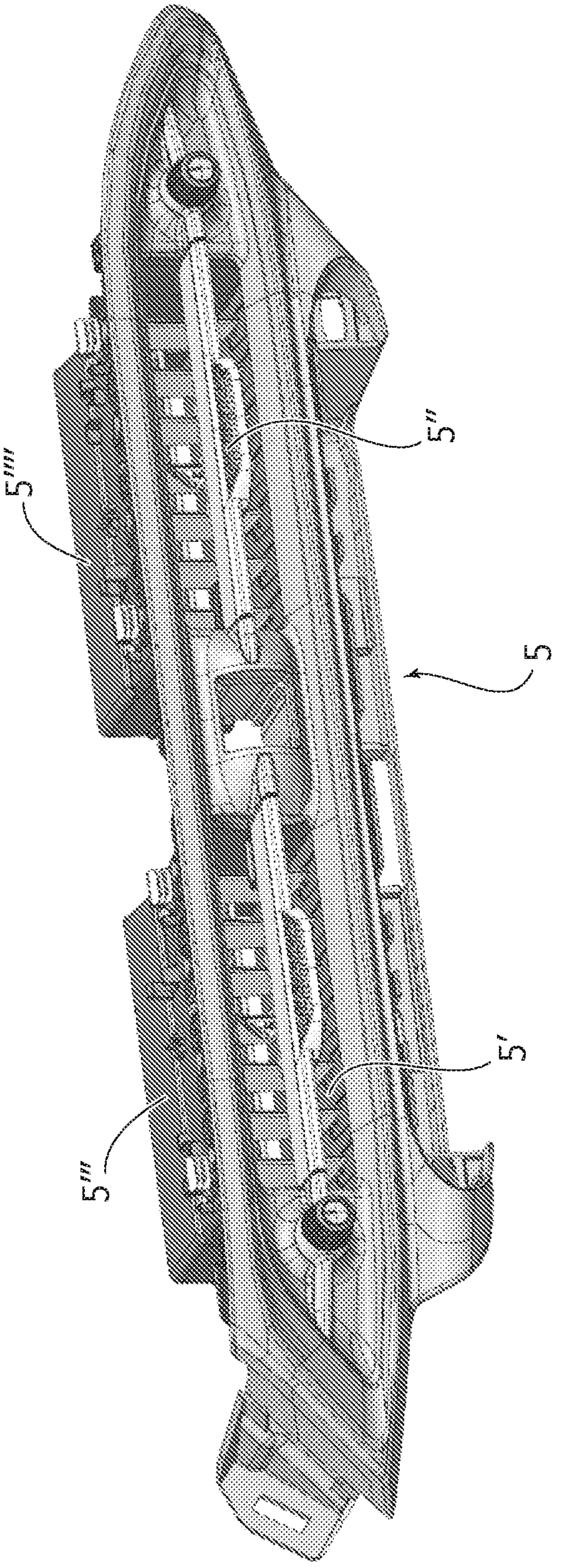
FIG. 2 is a perspective view of the central vent unit illustrated in FIG. 1.
Figure 3:
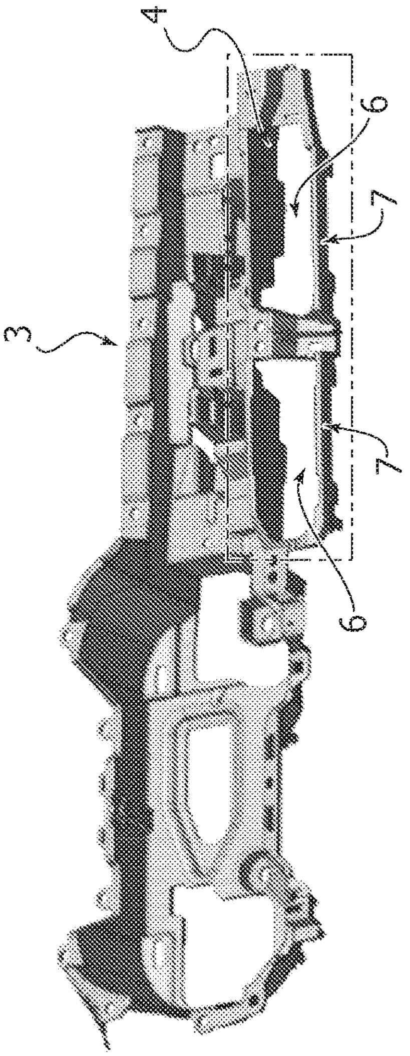
FIG. 3 is a perspective view of a shaped reinforcement body for fastening the central vent unit, according to an embodiment of the invention.
Figure 4:
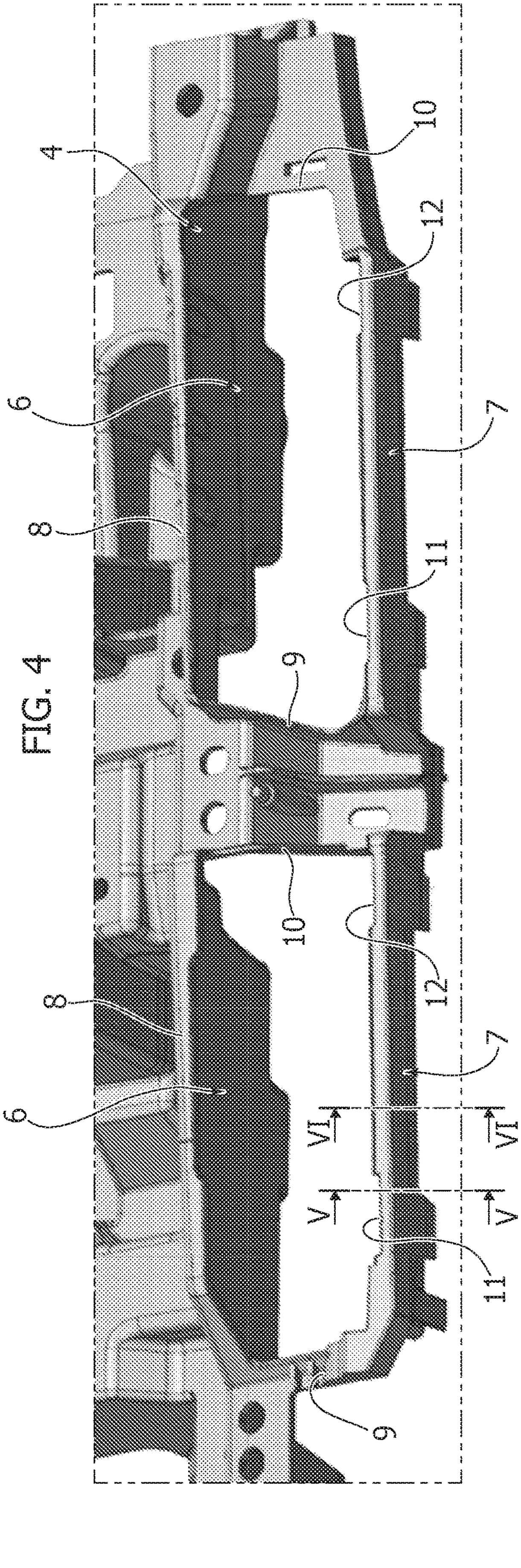
FIG. 4 is a perspective view at an enlarged scale that illustrates some components of the previous figures.

In the annexed drawings, designated by the reference number 2 is a main dashboard body, which defines a passenger-side portion, a central portion, and a driver-side portion. Designated as a whole by the reference number 5 is a central vent unit provided for directing a flow of air towards the inside of the motor vehicle, in particular towards the passengers. FIG. 2 is a perspective view of a preferred embodiment of the unit 5. The central vent unit 5 comprises a pair of vents 5', 5" arranged side by side and means for regulating autonomously the direction of outflow. Each vent 5', 5" comprises respective supporting and flow-guide bodies 5", 5'" provided for channelling the flow of air towards the outlet of the vents 5', 5". In the embodiment illustrated in the drawings, the supporting and flow-guide bodies 5'", 5"" are substantially parallelepipedal in shape.

As illustrated in FIGS. 1, 3, 4, and 7, the dashboard assembly 1 basically comprises a shaped reinforcement body 3 associated to the main body 2 and extending mainly along said central portion and said driver-side portion of the dashboard 1. The reinforcement body 3 is not visible from outside the dashboard assembly 1 in the final assembled condition, given that it is mounted internally with respect to the front outer surface of the dashboard assembly 1 (applied, for example, on which is a decorative coating layer). The shaped reinforcement body 3, generally made of plastic material, is equipped with purposely provided fastening areas designed to enable proper positioning and fastening of various components integrated in the dashboard 1. The shaped reinforcement body 3 may be made of a single piece or else of a number of parts appropriately coupled together. Illustrated in the annexed drawings is an example of shaped reinforcement body 3 comprising a driver-side portion and a central portion made of a single piece of polycarbonate, for example polycarbonate/acrylonitrile-butadiene-styrene ("PC+ABS").

According to the invention, the shaped reinforcement body 3 is provided with a fastening seat 4 configured for receiving and fastening the central vent unit 5. As illustrated in the view at an enlarged scale of FIG. 4, the fastening seat 4 comprises two frames 6 arranged side by side provided for selectively receiving the supporting and flow-guide bodies 5'" 5"" of the vents 5', 5". The fastening framed 6 are obtained in a bottom area of the central portion of the shaped reinforcement body 3 with reference to the final assembled condition.

Each fastening frame 6 comprises a seat substantially having a rectangular shape defining a bottom side 7, a top side 8, and lateral frame portions 9, 10. The seat is sized for receiving the supporting and flow-guide bodies 5'", 5"" of the vents 5', 5"; for this reason the bottom side 7 and the top side 8 have a greater length than the lateral frame portions 9, 10. Each bottom side 7 is defined by a thinned-out strip, provided in which are fastening portions 11, 12 mutually engaged with respective snap-action means 13 integrated in the respective air vent 5', 5". In the embodiment illustrated in the drawings, each fastening frame 6 comprises a pair of fastening portions 11, 12. In other words, each strip comprises two fastening portions 11, 12 spaced apart substantially at the ends of the strip.

According to a characteristic of the invention, the dimensions of each bottom frame side 7 differ along the extension of the strip.

Figure 5A:
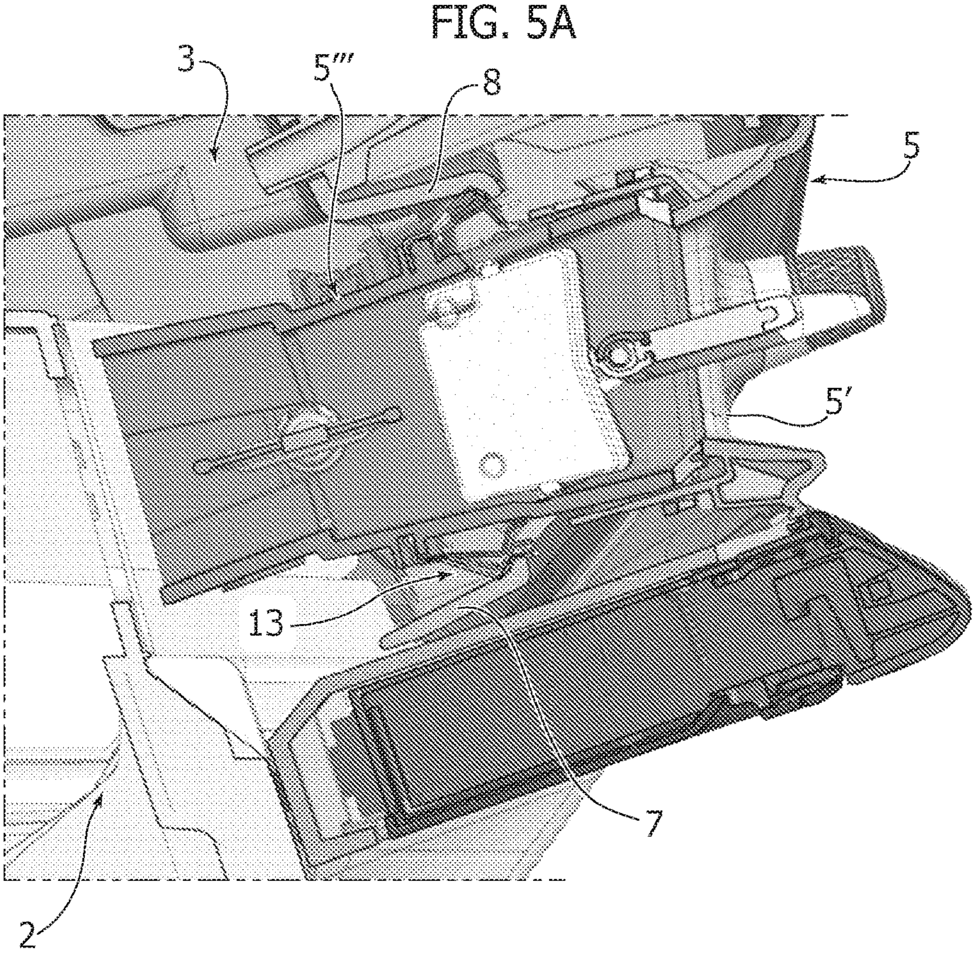
FIG. 5A is a cross-sectional view according to the line V-V appearing in FIG. 4, which illustrates the dashboard in an assembled configuration.
Figure 5B:
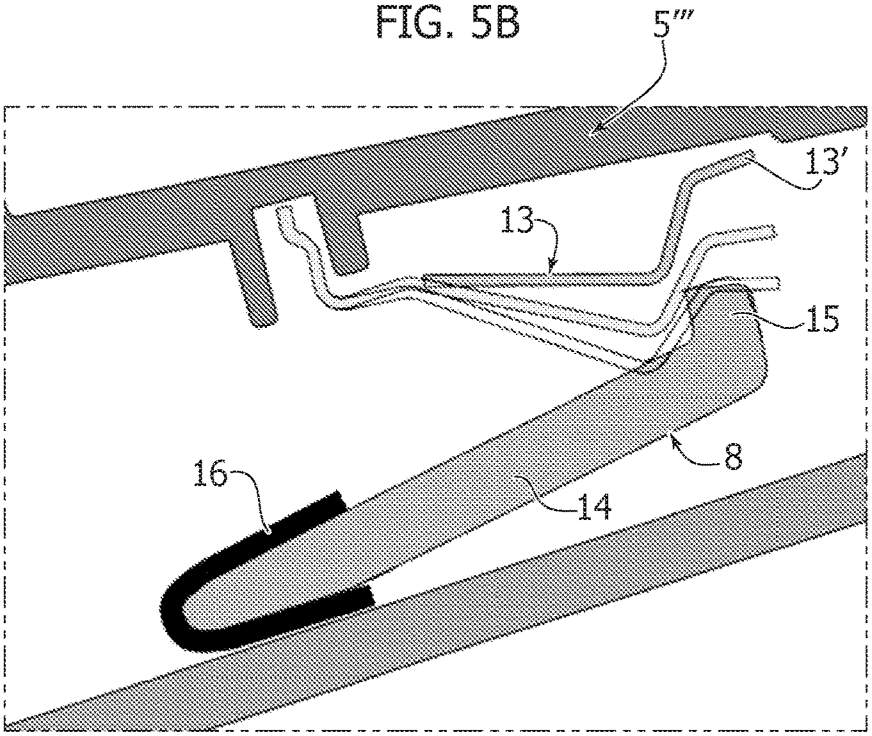
FIG. 5B is a perspective view at an enlarged scale of some components of FIG. 5A.

FIG. 5A is a cross-sectional view of the strip, according to the line V-V indicated in the previous figures, taken in a region corresponding to a fastening portion 11. As illustrated in the view at an enlarged scale of FIG. 5B, it should be noted that the strip has a substantially L-shaped body defining a main side 14 extending towards the inside of the dashboard 1 in a horizontal direction substantially parallel to the supporting and flow-guide body 5'", 5"" and a second side 15 extending in a vertical direction with reference to the final assembled condition of installation on the motor vehicle. As illustrated in FIG. 5B, the snap-action means 13 of the vent unit 5 comprise an elastically compliant body with a tooth-like portion 13' engaged with the second side 15 of the strip. It should be noted that the snap-action means 13 may be provided also at the top for mutual engagement with the top frame side 8. Designated by the reference 16 is an element made of felt that surrounds the terminal portion of the main side 14 of the strip to prevent direct contact with the supporting and flow-guide body 5'". According to a preferred embodiment, in the area of the fastening portion 11 described above, the strip has the following dimensions: 25 mm for the main side 14; 7 mm for the second side 15; and 2.8 mm for the thickness defining the main side 14.

Figure 6A:
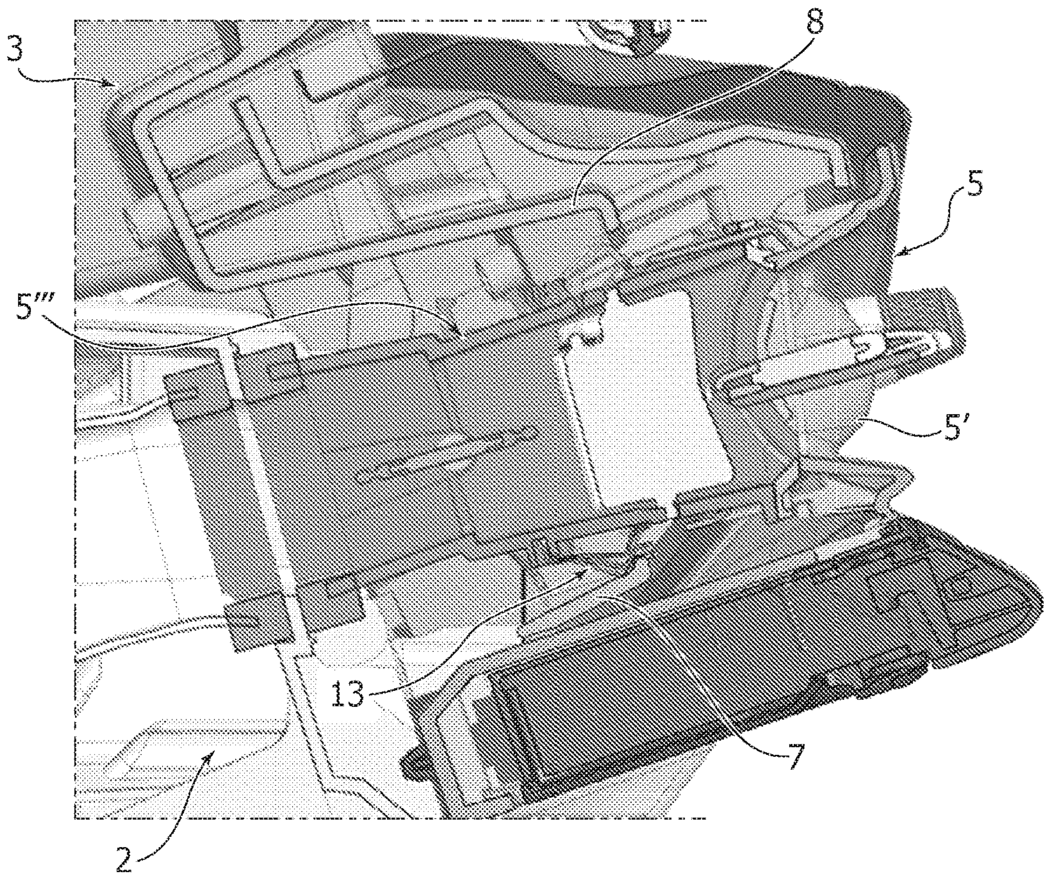
FIG. 6A is a cross-sectional view according to the line VI-VI appearing in the FIG. 5B, which illustrates the dashboard in an assembled configuration.
Figure 6B:
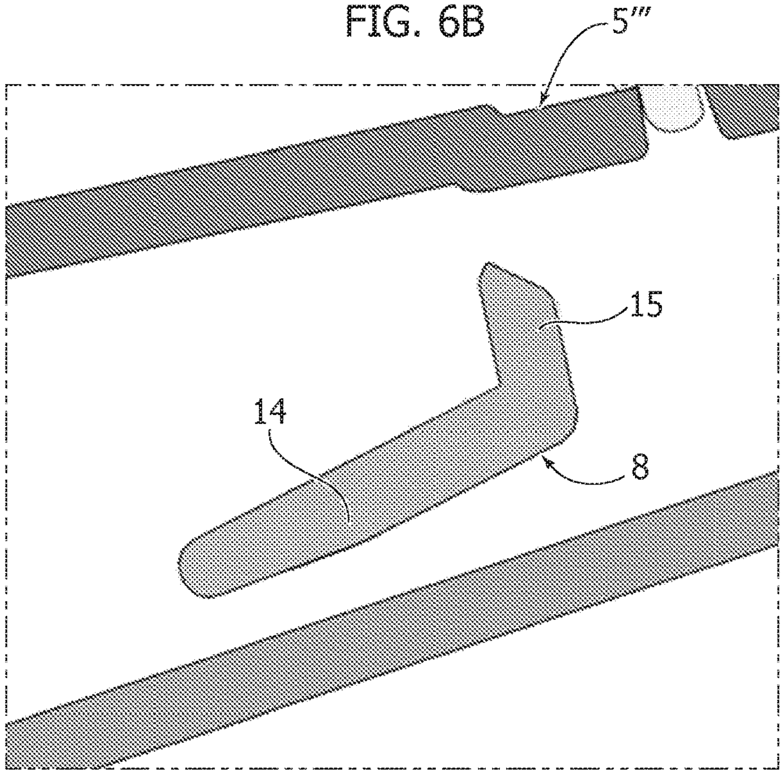
FIG. 6B is a perspective view at an enlarged scale that illustrates some components of FIG. 6A.

FIG. 6A is a cross-sectional view of the strip obtained in a central portion of the bottom side 7 of the frame 6, in which the snap-action means 13 of the vent unit 5 are not engaged. As illustrated in the view at an enlarged scale of FIG. 6B, it should be noted that the strip also has in this area a substantially L-shaped body defining a main side 14 extending towards the inside of the dashboard 1 in a horizontal direction substantially parallel to the supporting and flow-guide body 5'", 5'" and a second side 15 extending in a vertical direction with reference to the final assembled condition of installation on the motor vehicle. It should be noted that, in the above central area (hence excluding the fastening portions 11, 12), the strip is not in contact with the walls that define the supporting and flow-guide body 5'", 5"" of the vents 5', 5". According to a preferred embodiment, in the central area described above, the strip has the following dimensions: 15.5 mm for the main side 14; 9.4 mm for the second side 15; and 2.8 mm for the thickness defining the main side 14. As regards the dimensions of the strip, more in general the aforesaid second side 15 has a smaller extension in the area of the fastening portions 11, 12, than does a central area in which coupling with the snap-action means 13 is not envisaged.

In the light of the characteristics described above, the strip defining the bottom frame side 7 has an elastic behaviour when the central vent unit 5 is mounted within the fastening frames 6, with the bottom side 7 that bends so as to enable a simple and effective connection of the central vent unit 5.

Figure 7:
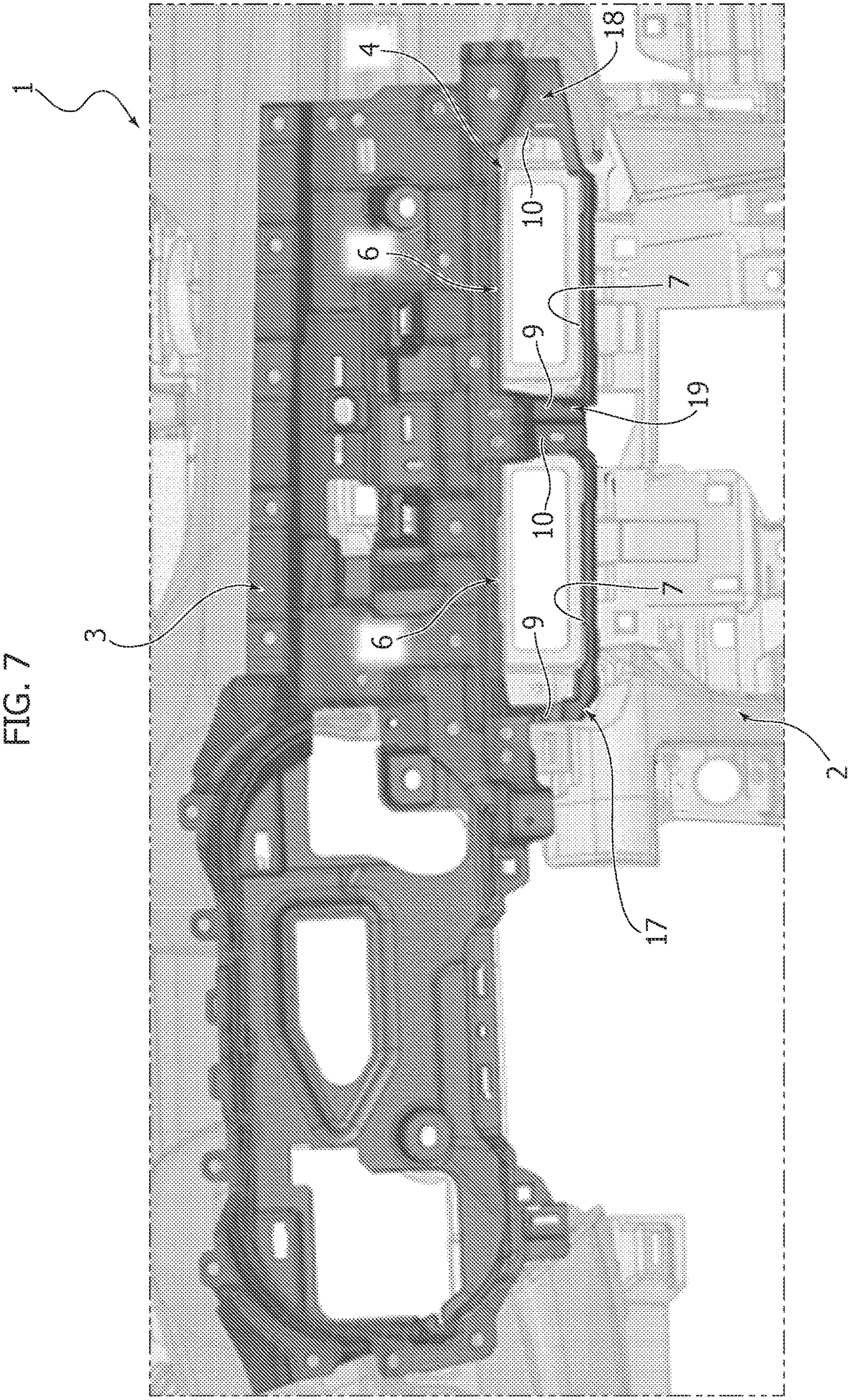
FIG. 7 is a further perspective view of the shaped reinforcement body illustrated in FIG. 3.
Figure 8A:
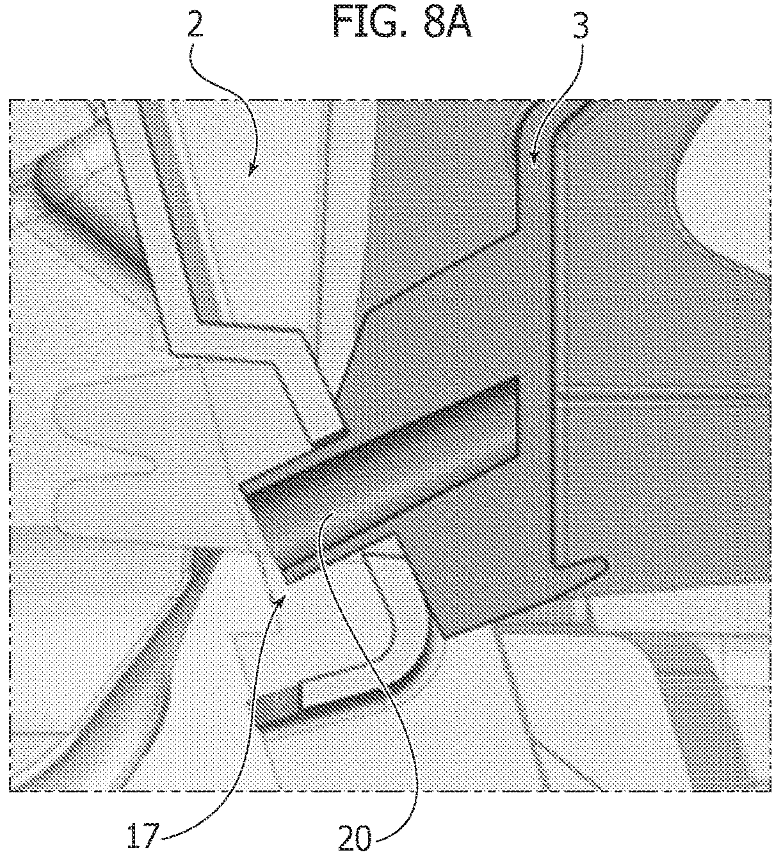
FIGS. 8A and 8B are perspective views at an enlarged scale, which illustrate some details of FIG. 7.
Figure 8B:
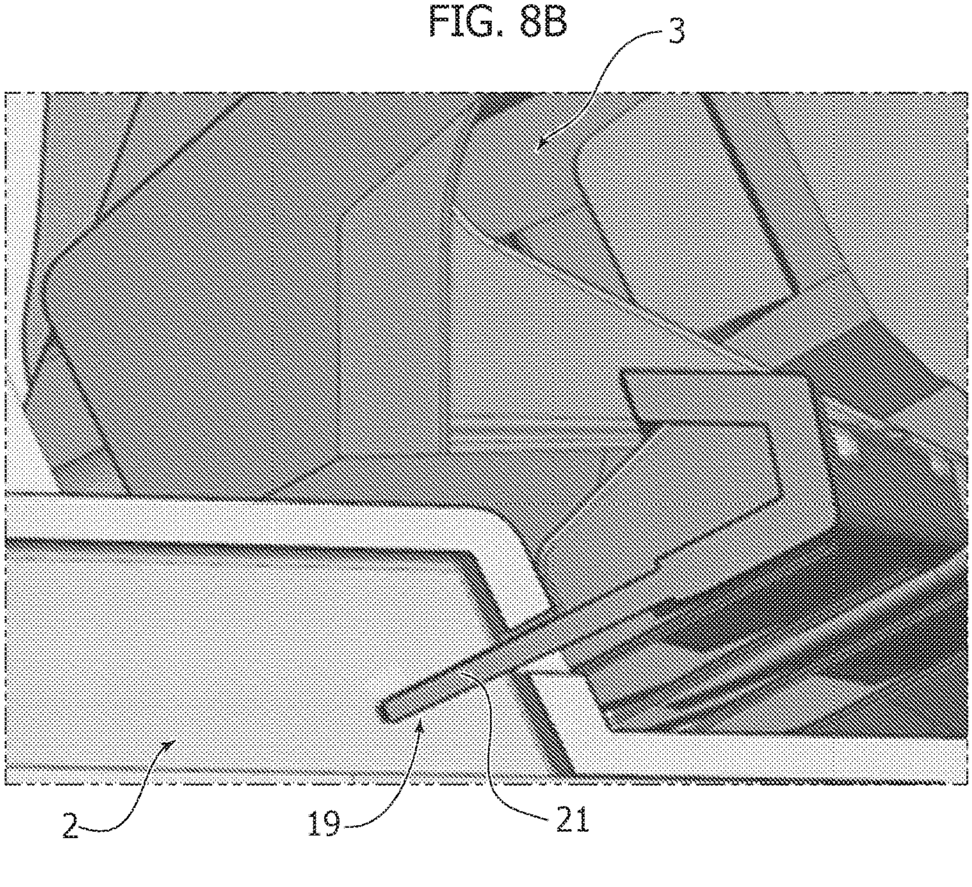

According to a further characteristic of the invention illustrated in FIGS. 7 and 8, in the proximity of the fastening seat 4, the shaped reinforcement body 3 comprises a plurality of portions constrained to the main dashboard body 2. More in particular, three welded areas 17, 18, 19 are present, in particular two welded end areas 17, 18 at opposite ends of the fastening seat 4 and a welded central area 19 between the two fastening frames 6. In a position corresponding to each welded area 17, 18, 19, the main dashboard body 2 comprises a hollow portion sized for receiving respective projecting elements 20, 21 of the shaped reinforcement body 3 (for example, integrated in a single piece with the reinforcement body 3). The projecting elements 20, 21 are welded to the main dashboard body 2 in a position corresponding to the aforesaid hollow portions.

Of course, without prejudice to the underlying principle of the invention, the details of construction and the embodiments may vary widely with respect to what has been described and illustrated herein purely to way of example, without thereby departing from the scope of the present invention as defined by the annexed claims.

The invention claimed is:

1. A dashboard assembly for a motor vehicle, comprising:

a main dashboard body defining a passenger-side portion, a central portion, and a driver-side portion;

a shaped reinforcement body associated to said main dashboard body; and a central vent unit configured for directing a flow of air towards an inside of the motor vehicle, wherein said central vent unit comprises two air vents arranged side by side and respective supporting and flow-guide bodies, wherein said shaped reinforcement body comprises a fastening seat in said central portion and configured for receiving and fastening said central vent unit, wherein said fastening seat comprises two adjacent fastening frames provided for selectively receiving said supporting and flow-guide bodies, and wherein each fastening frame comprises a bottom frame side defined by a thinned-out strip, provided on which are fastening portions mutually engaged with respective snap-action means of the respective air vent, said bottom frame side having an elastic behaviour when the central vent unit is mounted within the fastening frames.

2. The dashboard assembly according to claim 1, wherein said fastening frames are in a bottom area of a central portion of the shaped reinforcement body with reference to a final assembled condition.

3. The dashboard assembly according to claim 1, wherein said shaped reinforcement body is made of a single piece of polycarbonate.

4. The dashboard assembly according to claim 1, wherein each fastening frame has a substantially rectangular shape defining said bottom frame side, a top side, and lateral frame portions.

5. The dashboard assembly according to claim 1, wherein each thinned-out strip comprises two fastening portions spaced apart substantially at ends of the thinned-out strip.

6. The dashboard assembly according to claim 5, wherein each thinned-out strip has a substantially L-shaped body defining a main side extending towards an inside of the dashboard assembly in a horizontal direction substantially parallel to the supporting and flow-guide body, and a second side extending in a vertical direction with reference to a final assembled condition.

7. The dashboard assembly according to claim 6, wherein dimensions of each bottom frame side differ along an extension of the thinned-out strip, and wherein said second side in an area of the fastening portions has a smaller extension than does a central area of the thinned-out strip where coupling with the snap-action means is not envisaged.

8. The dashboard assembly according to claim 6, wherein the snap-action means of the central vent unit comprise an elastically compliant body with a tooth-like portion engaged to the second side of the strip.

9. The dashboard assembly according to claim 7, wherein in said central area of the thinned-out strip, the thinned-out strip is not in contact with the supporting and flow-guide body.

10. The dashboard assembly according to claim 1, comprising a plurality of welded areas for constraining the shaped reinforcement body to the main dashboard body, where, in each welded area, the main dashboard body comprises a hollow portion sized for receiving respective projecting elements of the shaped reinforcement body.

* * * * *